(12) United States Patent
Terashita (10) Patent No.: US 7,984,882 B2
(45) Date of Patent: Jul. 26, 2011

(54) TRIPOD HEAD

(75) Inventor: Yutaka Terashita, Takarazuka (JP)

(73) Assignee: Shashin Denki Kogyo, Takarazuka-shi (JP)

( * ) Notice: Subject to any disclaimer, the term of this patent is extended or adjusted under 35 U.S.C. 154(b) by 416 days.

(21) Appl. No.: 12/170,709

(22) Filed: Jul. 10, 2008

(65) Prior Publication Data

US 2009/0026329 A1    Jan. 29, 2009

(30) Foreign Application Priority Data

Jul. 26, 2007  (JP) ................................. 2007-194948
Jan. 31, 2008  (JP) ................................. 2008-021284

(51) Int. Cl.
*G03B 17/56* (2006.01)
*G03B 15/02* (2006.01)

(52) U.S. Cl. ................................. 248/124.2; 248/177.1

(58) Field of Classification Search ............... 248/124.2, 248/176.1, 177.1, 178.1, 186.1, 187.1, 229.11, 248/229.21, 231.31
See application file for complete search history.

(56) References Cited

U.S. PATENT DOCUMENTS

| | | | | | |
|---|---|---|---|---|---|
| 1,282,676 | A | * | 10/1918 | Carlin | 248/124.2 |
| 2,459,040 | A | * | 1/1949 | Miller | 248/183.1 |
| 2,481,717 | A | * | 9/1949 | Blair | 248/183.2 |
| 2,538,170 | A | * | 1/1951 | Stritter | 36/16 |
| 3,356,325 | A | * | 12/1967 | Schnase | 248/187.1 |
| 3,423,056 | A | * | 1/1969 | Welt | 248/187.1 |
| 4,736,217 | A | * | 4/1988 | McDowell | 396/428 |
| 5,769,370 | A | * | 6/1998 | Ashjaee | 248/181.1 |
| 5,930,036 | A | * | 7/1999 | Cluff | 359/420 |

FOREIGN PATENT DOCUMENTS

JP          5-29462          7/1993

* cited by examiner

*Primary Examiner* — Anita M King
(74) *Attorney, Agent, or Firm* — Oblon, Spivak, McClelland, Maier & Neustadt, L.L.P.

(57) ABSTRACT

There is disclosed a tripod head for mounting a device to be held (such as an illumination device) to a support base at an adjustable angle of depression or elevation. The tripod head is designed to avoid increase in size of a mounting member that supports the device to be held. Furthermore, hand fingers are prevented from entering an arc-shaped groove formed in a disk used to adjust the angle of the held device; otherwise, the fingers would be injured. The tripod head permits a mounting member 3, which is used to hold the device 10 to be held, to be mounted on a support base 2 such that the angle of depression or elevation of the device can be adjusted. The mounting member 3 has a mounting shaft 32 mounted to the support base 2. The mounting shaft 32 extends horizontally through the support base and is rotatably pivoted to it. The mounting shaft has a front-end portion extending through the support base. A disk 33 is mounted to the front-end portion. An arc-shaped groove 35 located about the axis of the mounting shaft is formed in a peripheral portion of the disk. A threaded rod 24 stands upright from the support base and is inserted in the groove. The threaded rod has a threaded portion in its front end. A nut 45 having a handle 46 is threadedly inserted over the threaded portion. The fringes of the groove in the disk can be tightened and secured to the support base.

11 Claims, 10 Drawing Sheets

TRIPOD HEAD

TECHNICAL FIELD

The present invention relates to a tripod head that permits a device to be held such as an illumination device for illuminating a subject (such as a photographic subject, a TV camera target, or a cinematographic target), cameras for shooting the subject, or arbitrary measurement instruments to be mounted on a stand or tripod at an adjusted angle of depression or elevation.

BACKGROUND ART

Heretofore, tripod heads on stands or tripods have been frequently used to enable illumination devices, various cameras, measurement instruments, and so on to be mounted at an adjustable angle of depression or elevation.

One example of these tripod heads which are adapted for use with a relatively small-sized, lightweight device to be held such as an illumination device is described, for example, in patent reference 1 (JP-UM-B-5-29462) that a support base is supported on a stand, a mounting member for mounting a tubular base member mounted in the base of an illumination device is supported directly to the support base tiltably with a threaded rod facing in the horizontal direction and thus, the illumination device can be mounted tiltably. However, where the illumination device is large in size and relatively heavy, sufficient holding force is not obtained only with the threaded rod. Therefore, a more rugged tilt angle-adjusting mechanism is required.

Figure 11:
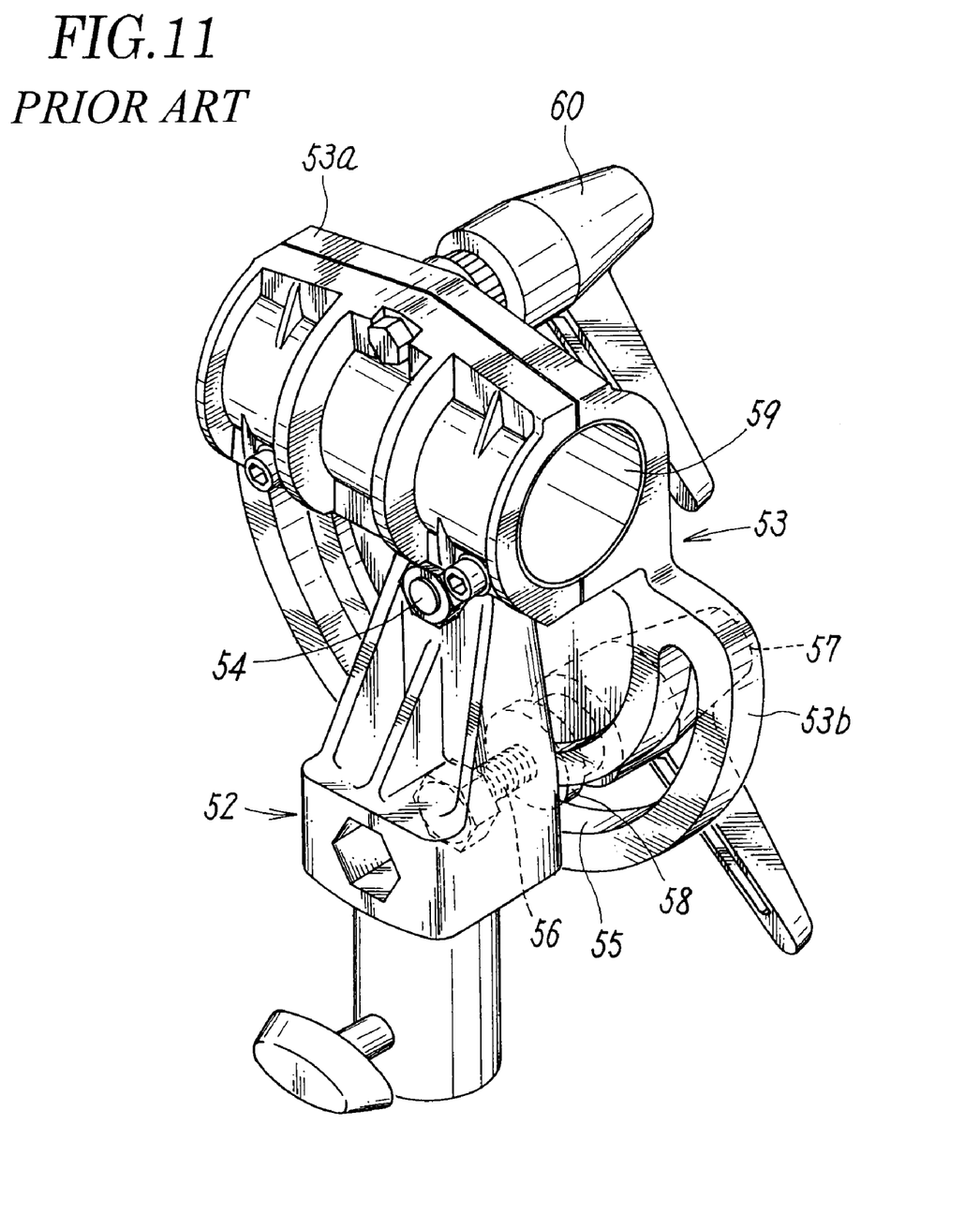
FIG. 11 is a perspective view showing the configuration of an existing tripod head.

A tripod head coping with this problem is already known and shown in FIG. 11. This tripod head has a mounting member 53 for mounting the base portion of an illumination device or the like to a support base 52, and when the mounting member 53 is tightened and fastened to the support base 52, the mounting member 53 is tiltably pivoted to the support base 52 via a mounting shaft 54. An incomplete disk 53b coaxial with the mounting shaft 54 is mounted integrally with the mounting member 53. An arc-shaped groove 55 is formed in a peripheral portion of the disk 53b and located around the axis of the mounting shaft 54. A threaded rod 56 standing upright from the support base 52 is inserted in the arc-shaped groove 55. A nut 57 equipped with a handle tightens the fringes of the arc-shaped groove 55 against the support base 52 via a frictional member 58. The body portion 53a of the mounting member 53 for mounting the device to be held such as an illumination device is integrally mounted to the disk 53b.

In FIG. 11, reference numeral 59 denotes securing hole which is provided in the body portion 53a of the mounting member 53 and into which the tubular base member provided to the base portion of the illumination device or the like is inserted and secured. Reference numeral 60 denotes a nut with a handle to tighten the hole 59 therewith.

With the tripod head of this construction, the mounting member 53 for the illumination device or the like is mounted to the support base 52 at two mutually spaced positions, i.e., a pivotal position at which the mounting member 53 is tiltably mounted to the support base 52 and a tightening position at which the fringes of the arc-shaped groove formed in the disk 53b are tightened by the nut 57 threaded over the threaded shaft 56 of the support base 52. Consequently, the mounting member 53 can be fixed to the support base 52 in a desired tilted state more firmly.

However, it is necessary for the disk 53b itself to hold the posture of the mounting member 53 because the body portion 53a of the mounting member 53 is mounted integrally with the mounting member 53 via the disk 53b. At the same time, the disk 53b and the mounting member 53 having the disk 53b need to be strong enough to support the weight of the device to be held such as an illumination device that might be mounted on the mounting member 53. This increases the size of the mounting member 53 including the disk 53b.

Furthermore, if the body portion 53a of the mounting member 53 is mounted integrally with the disk 53b and the body portion 53a including the disk 53b is increased in size, the mounting member 53 has a relatively large eccentric heavy portion around the mounting shaft 54 rotatably pivoted to the support base 52. Therefore, at the stage of a work for gripping the support base 52 of the tripod head and mounting the base to a stand or tripod, if the nut 57 is not sufficiently tightened against the threaded rod 56, the heavy mounting member 53 may rotate about the mounting shaft 54 and fall, depending on the posture of the tripod head, even if no device to be held is attached to the mounting member 53.

In this case, falling of the heavy mounting member 53 poses dangers. In addition, a hand is often attached to the mounting member 53 to support it. If the arc-shaped groove 55 is exposed on both sides of the threaded rod 56, fingertips of the hand may enter the groove 55. In this case, there is the possibility that the fingertips in the groove are cut between the fringe of the arc-shaped groove 55 and the nut 57.

Moreover, where a heavy device to be held such as an illumination device is mounted to the mounting member 53 and one attempts to adjust the tilt angle, for example, of the illumination device, the illumination device may rotate about the mounting shaft 54 and fall quickly due to unforeseeable loosening of the nut 57 relative to the threaded rod 56. In this case, too, if fingertips of a hand are inserted in the arc-shaped groove 55, there is the possibility that the fingertips present within the groove are cut off.

DISCLOSURE OF THE INVENTION

It is a technical object of the present invention to provide a tripod head for mounting a device to be held such as the aforementioned illumination device to a support base at an adjustable angle of depression or elevation, the tripod head being designed to cause a disk having an arc-shaped groove in its peripheral portion to be held to the mounting member of the device pivoted to the support base. A threaded rod extending perpendicular from the support base is inserted in the groove. The fringes of the arc-shaped groove are tightened against the support base with a nut having a handle. Where the held device such as the illumination device is supported via a body portion of the mounting member mounted around the disk, increase in size of the mounting member is prevented.

It is another technical object of the invention to provide a tripod head which has a disk mounted to the mounting member of the above-described device to be held. The disk has an arc-shaped groove in its peripheral portion. A threaded rod extending perpendicular from a support base is inserted in the arc-shaped groove. The fringes of the groove are tightened by a nut having a handle. The tripod head can prevent inadvertent rotation of the mounting member into the arc-shaped groove irrespective of whether a heavy device to be held is mounted to the mounting member; otherwise, fingertips inserted in the groove would be cut off.

A tripod head which is associated with the present invention and which solves the foregoing problem has a support base and a mounting member for holding the mounting base portion of a device to be held, the mounting member being capable of being mounted to the support base such that the angle of depression or elevation of the held device can be adjusted. The mounting member has a mounting shaft mounted to the support base. The mounting shaft extends horizontally through the support base and is rotatably pivoted. The mounting shaft has a front-end portion extending through the support base. A disk coaxial with the mounting shaft is held to the front-end portion. An arc-shaped groove is formed in a peripheral portion of the disk and located about the axis of the mounting shaft. A threaded rod extending perpendicular from the support base is inserted in the arc-shaped groove formed in the disk. The threaded rod has a threaded portion in its front end. A nut having a handle is threadedly inserted over the threaded portion in the front end of the threaded rod. The fringes of the groove of the arc-shaped groove in the disk can be tightened and secured to the support base.

In a preferred embodiment of the tripod head associated with the present invention, under the condition where the device to be held is not yet mounted to the mounting member, the weight distribution of the mounting member itself is set such that any eccentric heavy portion that would normally rotate the mounting member about the axis of the mounting shaft does not exist. Alternatively, the center of weight of the mounting member is located on the axis of the mounting shaft.

In another preferred embodiment of the tripod head associated with the invention, a cover plate coaxial with the disk is mounted over the disk so as to cover the arc-shaped groove at all times on the side of the disk facing away from the support base. The cover plate can rotate relative to the disk. A threaded rod extending perpendicular from the support base is inserted in the arc-shaped groove of the disk. The threaded rod is also inserted in a circular hole formed in a peripheral portion of the cover plate. The cover plate can be tightened and secured to the support base together with the disk by the nut.

In this case, the support base can be designed each that it always covers the arc-shaped groove of the disk, the disk being sandwiched between the cover plate over the mounting shaft and the support base.

In a further preferred embodiment of the tripod head associated with the present invention, the tripod head is used to permit a photographic illumination device that is one example of the device to be held can be mounted such that its direction of illumination has an adjustable angle of depression or elevation. The mounting member includes a body portion having the mounting shaft. The body portion is provided with a securing hole in which a tubular base member is inserted and secured, the tubular base member being mounted on the base portion of the illumination device. The tubular base member extends along the center axis of the direction of illumination in a sense opposite to that of illumination. The hole is provided in a direction perpendicular to the axis of the mounting shaft.

The tripod head of the present invention described in detail so far is used to mount the device to be held such as an illumination device to the support base at an adjustable angle of depression or elevation. The disk is mounted to the mounting member of the device to be held pivoted to the support base. The arc-shaped groove is formed in a peripheral portion of the disk. The threaded rod extending perpendicular from the support base is inserted in the arc-shaped groove. The fringes of the arc-shaped groove are tightened against the support base by the nut having the handle. Where the held device such as the illumination device is supported via the body portion of the mounting member mounted around the disk, increase in size of the mounting member can be eliminated. Where the threaded rod extending perpendicular from the support base is inserted in the arc-shaped groove formed in the peripheral portion of the disk and the fringes of the arc-shaped groove are tightened by the nut having the handle by holding the disk to the mounting member of the held device, inadvertent rotation of the mounting member can be prevented irrespective of whether or not the heavy device to be held has been mounted; otherwise, fingertips would enter the groove and be cut off.

BEST MODE FOR CARRYING OUT THE INVENTION

FIGS. 1-8 of the accompanying drawings indicate a first embodiment of a tripod head associated with the present embodiment. The tripod head is used to permit a device 10 to be held (such as an illumination device for illuminating a subject (e.g., a photographic subject, a TV camera target, or a cinematographic target)) to be mounted on a stand or tripod at an adjusted angle of depression or elevation. As shown in FIGS. 1-5, a dowel 21 is fitted into an object 1 such as the aforementioned stand or tripod to be mounted. A support base 2 is supported so as to be rotatable about the axis of the dowel 21. The device 10 to be held such as the illumination device has a base portion including a mounting member 3. The mounting member 3 permits the held device 10 to be mounted to the support base 2 at an adjusted angle of depression or elevation.

The photographic illumination device shown as one example of the device 10 to be held has a tubular base member 11 used for mechanical support. The base member 11 is mounted in the mounting base portion of the illumination device. As can be seen from FIGS. 5 and 6, the base member 11 extends in a sense opposite to that of illumination along the center axis of the direction of illumination. A rotatable main supportive member 12 is held to the outer surface of the base member 11. Four main supportive members 13 are connected to the rotatable main supportive member 12 such that the supportive members can be opened and closed. A tubular shaft 14 can be inserted into the tubular base member 11. A socket 15 for an electric bulb is mounted to the front end of the tubular shaft 14. A cord 16 for electrical energization of the socket 15 is drawn out to the base end side through both the tubular shaft 14 and tubular base member 11. A rotatable supportive sub-member 17 is held to the front end of the tubular shaft 14. Supportive sub-members 18 corresponding to the main supportive members 13 are connected to the rotatable supportive sub-member 17 such that the sub-members 18 can be opened and closed. The front ends of the supportive sub-members 18 are rotatably connected to intermediate portions of the main supportive members 13. Thus, the supportive members 13 can be opened and closed like an umbrella.

Referring to the drawings, reference numeral 5 denotes a light source, reference numeral 6 denotes a reflective sheet that diffusely reflect the light emitted from the light source 5, and reference numeral 7 denotes a diffuser screen, that is detachably stretched between the front ends of the main supportive members 13 with planar fasteners when the main supportive members 13 are opened to diffuse the light from the light source.

Figure 5:
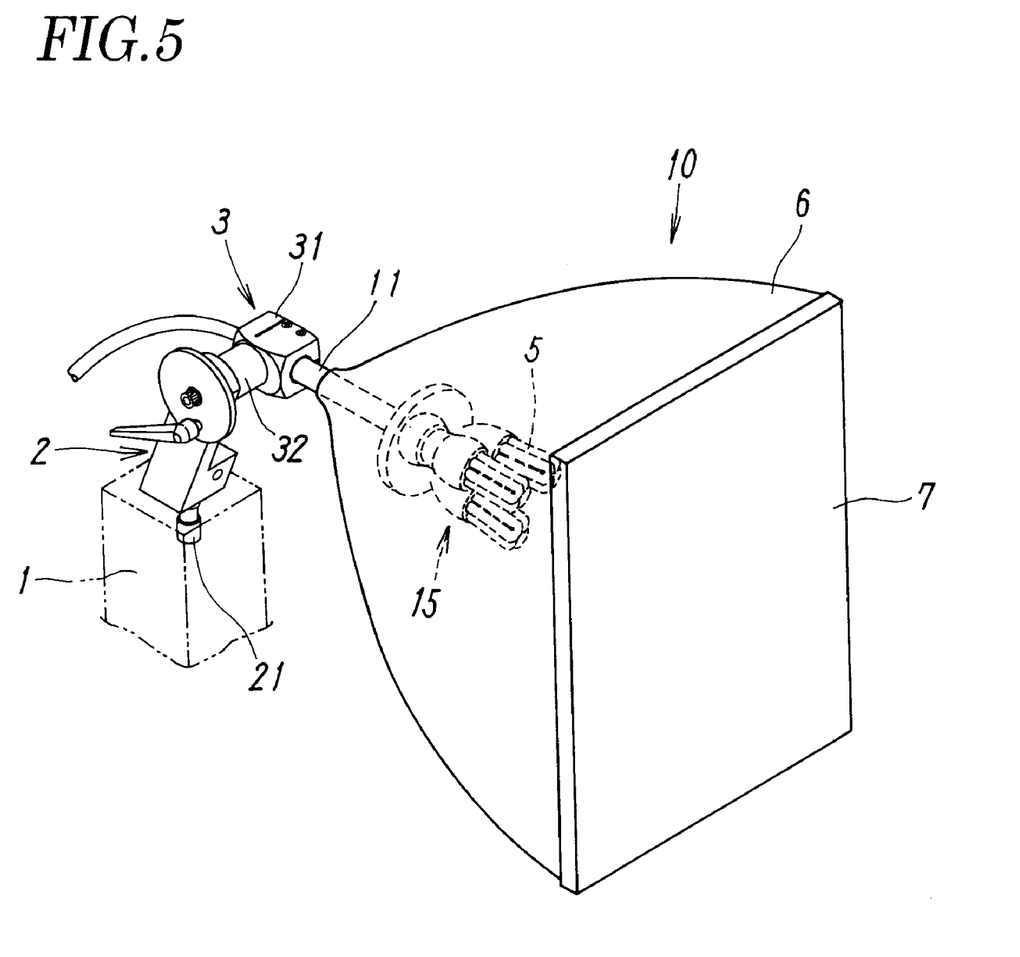
FIG. 5 is a perspective view illustrating the usage of the tripod head associated with the invention.
Figure 6:
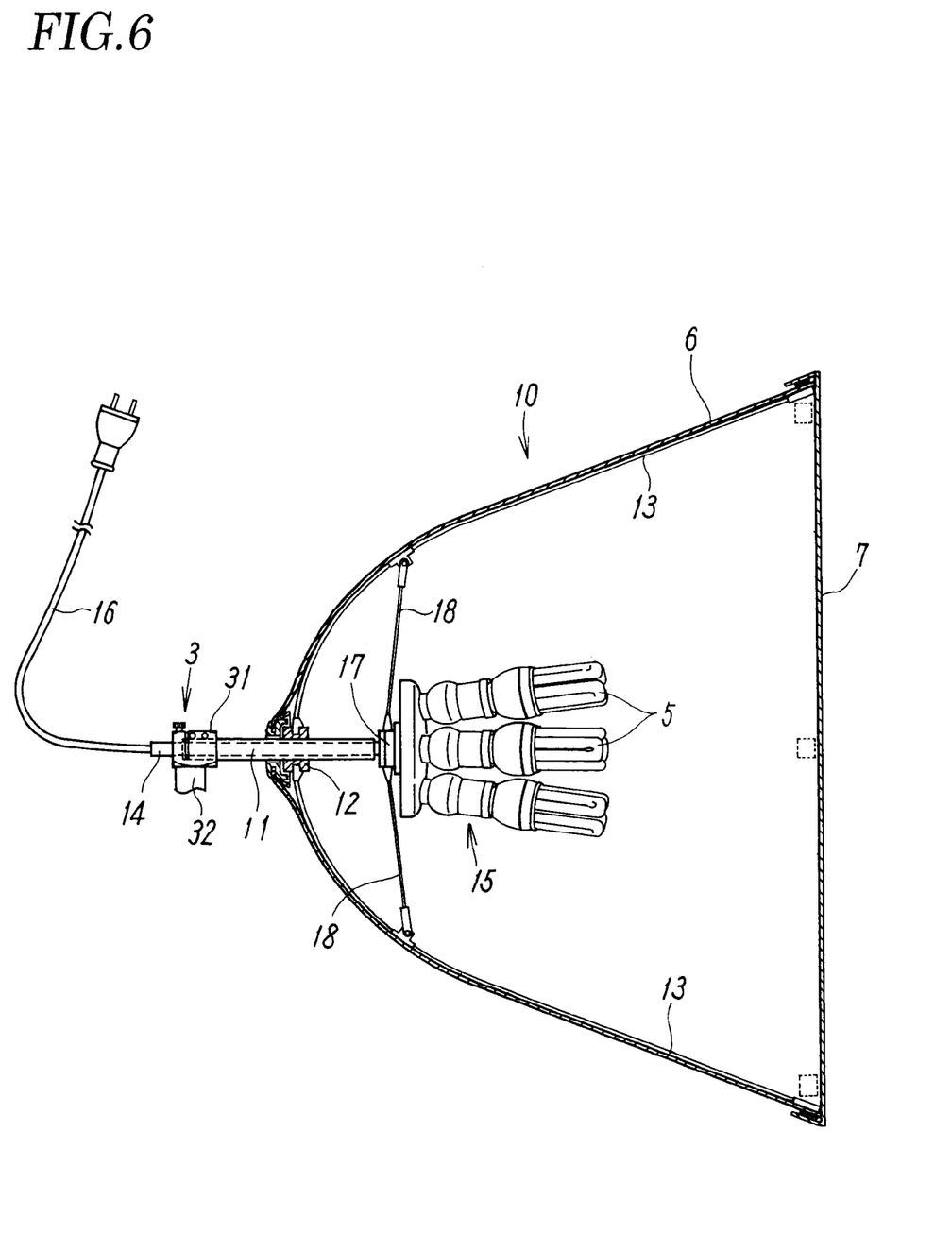
FIG. 6 is a cross-sectional view showing the configuration of an illumination device for use with the above-described embodiment.

The illumination device having the structure as described above can assume a state in which the main supportive members 13 and reflective sheet 6 have been folded. Under this condition, as shown in FIGS. 5 and 6, the tubular shaft 14 is inserted into the tubular base member 11 from inside of the reflective sheet 6, and the energization cord 16 is drawn to the outside from the base member 11. Under this condition, the rotatable supportive sub-member 17 is close to the rotatable main supportive member 12. The supportive sub-members 18 strongly spread out the main supportive members 13 and so the reflective sheet 6 is resiliently stretched like an umbrella. If the outer end of the tubular shaft 14 is pushed into the base member 11 from the state shown in FIGS. 5 and 6, the rotatable supportive sub-member 17 is pushed away from the rotatable main supportive member 12. Concomitantly, the main supportive members 13 are resiliently folded like an umbrella. At the same time, the energization cord 16 is pulled into the base member 11 together with the tubular shaft 14.

As clearly shown in FIGS. 1-4, the mounting member 3 has a body portion 31 provided with a securing hole 31a for holding the tubular base member 11 of the illumination device. The mounting shaft 32 is mounted integrally with the body portion 31 and extends horizontally through a support hole 22 formed in the support base 2. The mounting shaft 32 is rotatably pivoted. The securing hole 31a is provided in a direction perpendicular to the axis of the mounting shaft 32. Thus, when the mounting member 3 is rotated about the mounting shaft 32, the illumination device can be tilted relative to the support base 2. In particular, the angle of depression or elevation of the center axis of the direction of illumination of the illumination device can be adjusted.

Figure 7A:
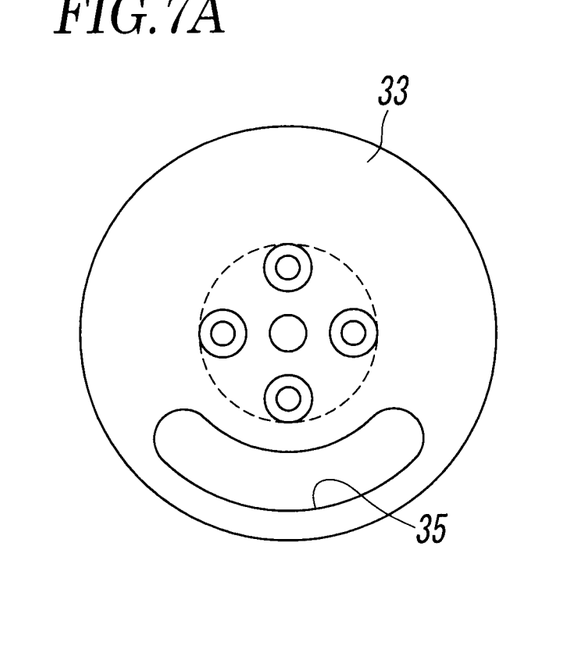
FIG. 7A is a front elevation of a disk held to a mounting member.
Figure 7B:
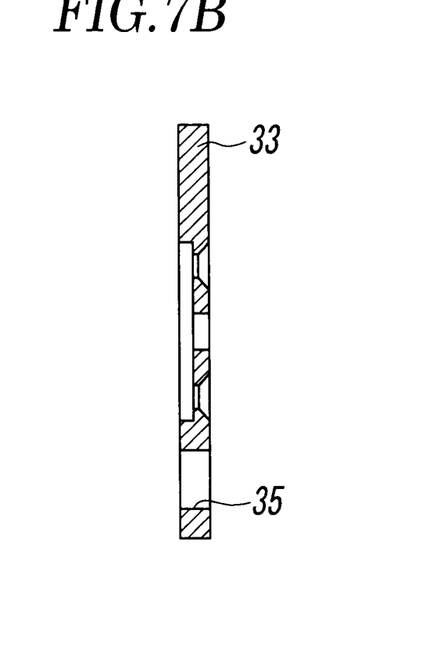
FIG. 7B is a cross-sectional view of the disk shown in FIG. 7A.
Figure 8A:
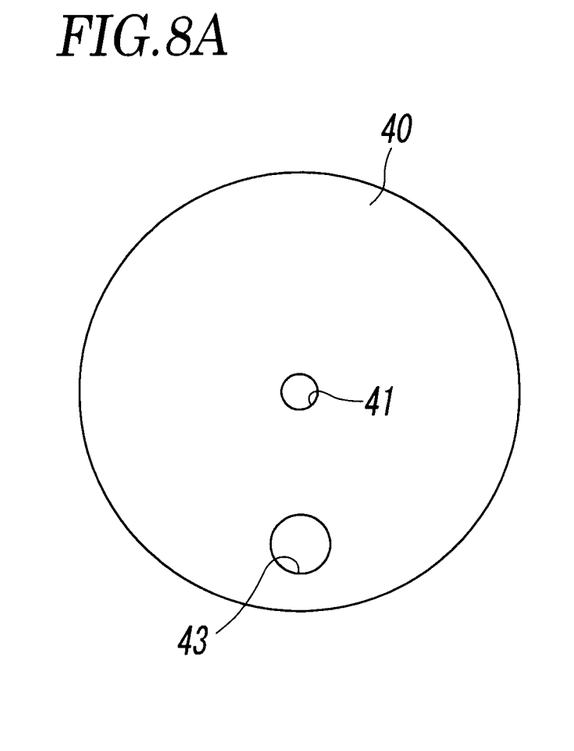
FIG. 8A is a front elevation of a cover plate mounted over the disk.
Figure 8B:
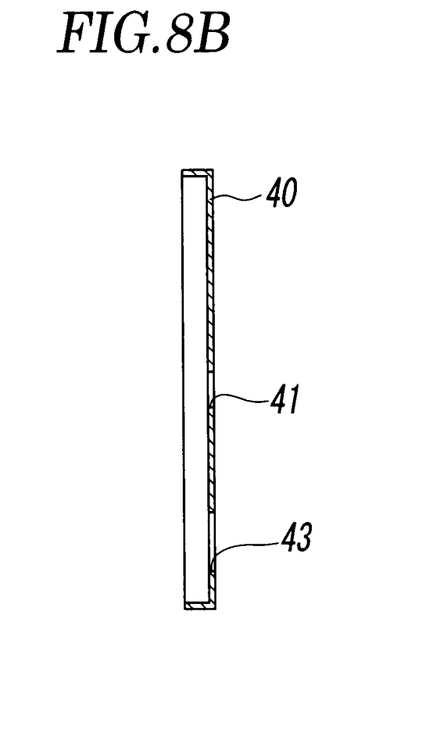
FIG. 8B is a cross-sectional view of the cover plate shown in FIG. 8A.

The mounting shaft 32 of the mounting member 3 has a front-end portion extending through the support base 2. The disk 33 is mounted to the front-end portion of the mounting shaft 32 with screws 34 coaxially with the mounting shaft 32 as shown in FIGS. 7A and 7B. An arc-shaped groove 35 having the center axis of the mounting shaft 32 as its center is formed in a peripheral portion of the disk 33. The threaded rod 24 extending perpendicular from the support base 2 is inserted in the arc-shaped groove 35 in the disk 33.

A disklike cover plate 40 (see FIGS. 8A and 8B) coaxial with the disk 33 is placed over the disk 33 and can rotate relative to the disk 33. The cover plate 40 provides a cover over the arc-shaped groove 35 on the side of the disk 33 facing away from the support base 2. The cover plate 40 is centrally provided with a hole 41 in which a screw 42 is inserted. The screw 42 is threadedly inserted into the mounting shaft 32 of the mounting member 3. As a result, the cover plate 40 is mounted to the mounting shaft 32. As described previously, the cover plate 40 is mounted to be capable of rotating relative to the disk 33. Accordingly, the arc-shaped groove 35 appearing on the surface of the disk 33 facing away from the support base 2 is totally covered at all times.

The threaded rod 24 extending perpendicular from the support base 2 is inserted into the circular hole 43 formed in a peripheral portion of the cover plate 40 as well as into the arc-shaped groove 35 of the disk. The nut 45 having the handle 46 is screwed in the front-end portion of the threaded rod 24. The nut 45 having the handle 46 is used to tighten and secure the fringes of the arc-shaped groove 35 of the disk 33 to the support base 2. To stabilize the tightening, frictional members 47 and 48 fitted over the threaded rod 24 are interposed between the support base 2 and the disk 33 and between the outer surface of the cover plate 40 and a pair of disk springs 49, respectively. The frictional member 48 abuts against the outer surface of the cover plate 40. The disk springs 49 are mounted between the frictional member 48 and the nut 45.

Figure 1:
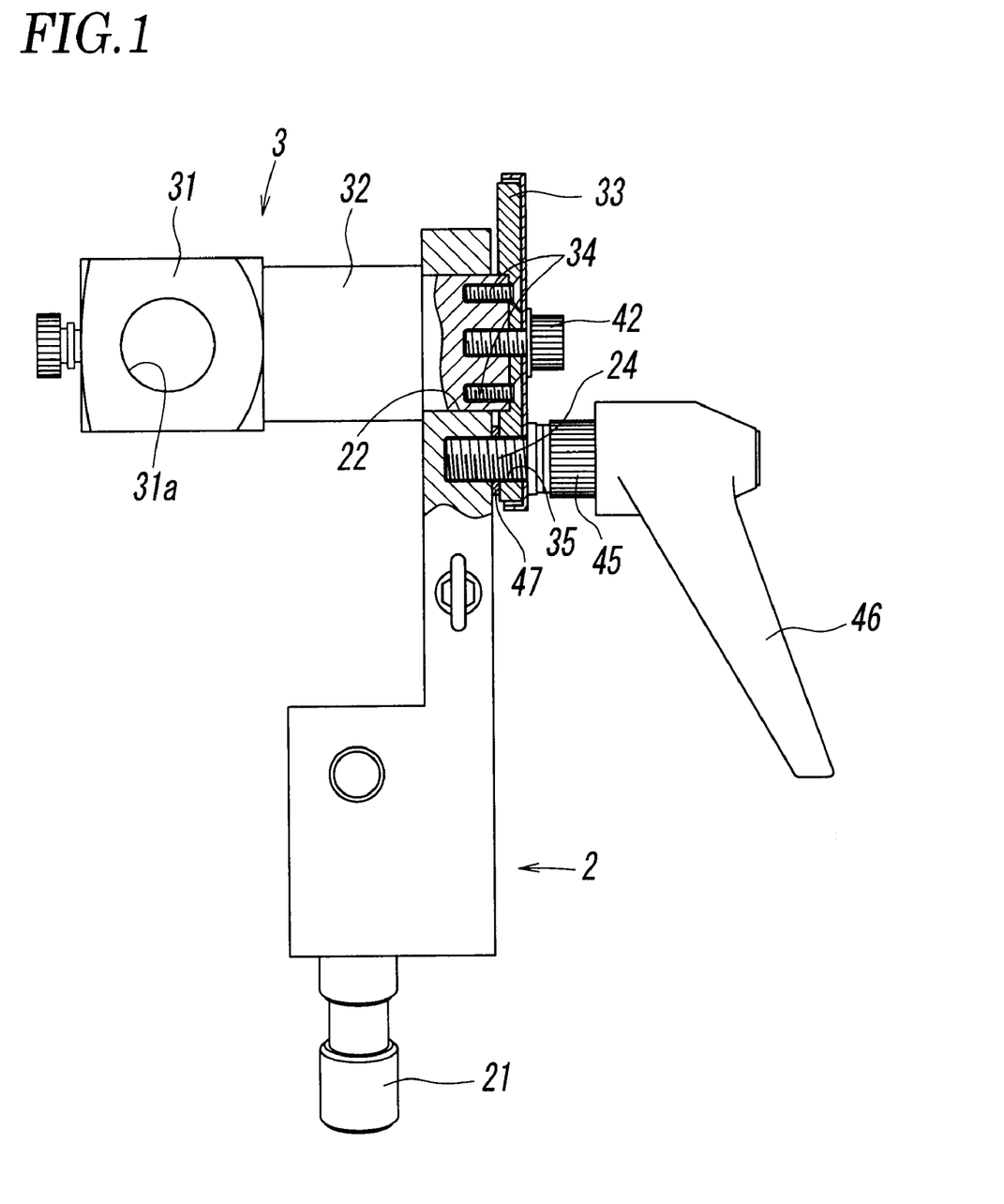
FIG. 1 is a partially cutaway front elevation of a first embodiment of a tripod head associated with the present invention.
Figure 2:
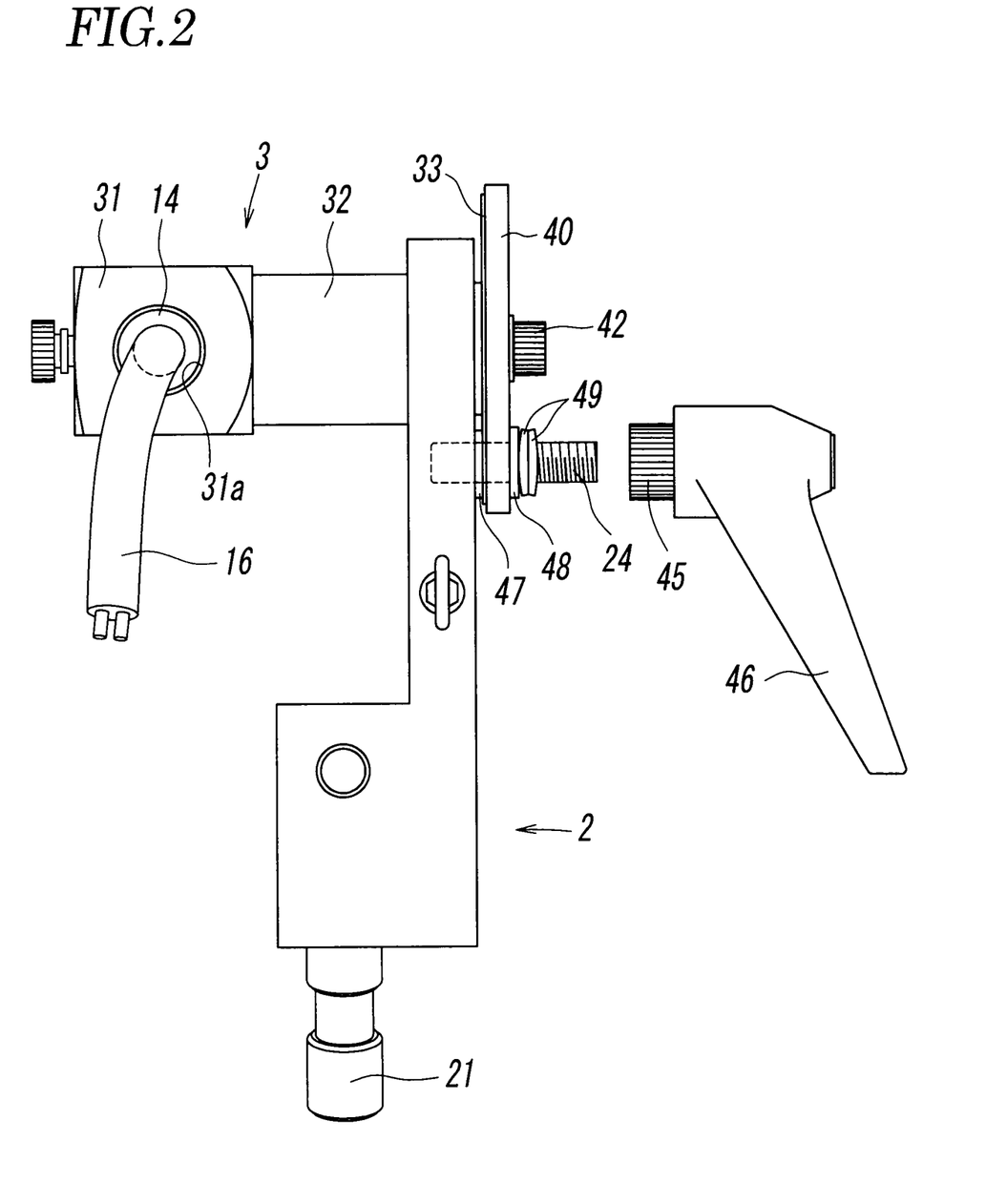
FIG. 2 is a partially exploded front elevation of the embodiment.
Figure 4:
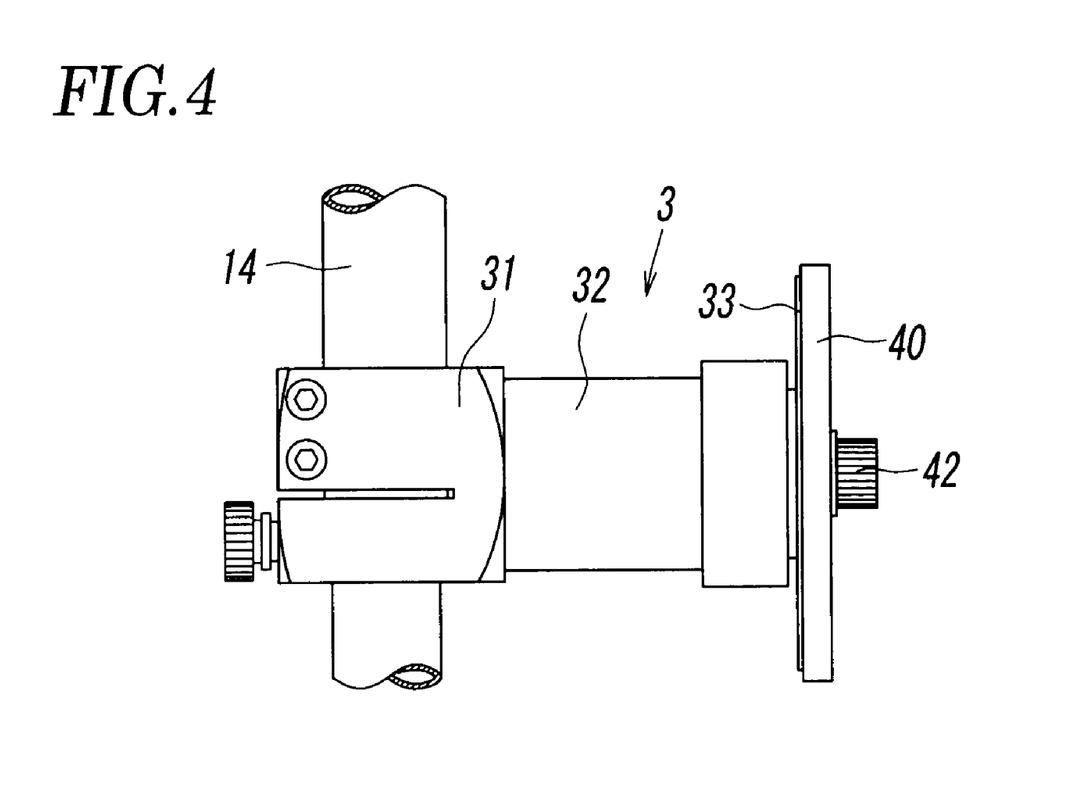
FIG. 4 is a plan view of the embodiment.

As can be seen from FIGS. 1 and 4, the mounting shaft 32 of the mounting member 3 is mounted integrally with the body portion 31. The mounting shaft 32 is pivoted to the support base 2. Therefore, the body portion 31 is not mounted around the disk 33 unlike the existing tripod head shown in FIG. 11. Consequently, even under the condition where the device 10 is not held, the weight distribution of the mounting member 3 itself is set so that any eccentric heavy portion that would normally rotate the mounting member 3 about the axis of the mounting shaft 32 is not present. In other words, the center of gravity of the mounting member 3 is located substantially on the axis of the mounting shaft 32.

Because of this structure, any other member is not attached to the disk 33. This makes it possible to place the rotatable cover plate over the disk 33. Furthermore, by designing the mounting member 3 to have no eccentric heavy portion around the mounting shaft 32, the heavy mounting member 3 is prevented from being rotated about the mounting shaft 32 abruptly depending on the posture of the tripod head when the support base 2 of the tripod head is gripped and mounted on a stand or tripod. Hence, damage to hand fingers in the arc-shaped groove 35 is prevented.

The disk 33 tightened with the aforementioned nut 45. It is desired that the nut 45 be equipped with the handle 46 and that the disk be tightened strongly. Therefore, the arc-shaped groove 35 in the disk 33 needs some extent of width to increase the tightened area. Consequently, where one tries to adjust the tilt of the illumination device, there arises the possibility that fingertips are inadvertently inserted into the arc-shaped groove 35. As described previously, however, as the threaded rod 24 upright extending perpendicular from the support base 2 is inserted into the circular hole 43 formed in the peripheral portion of the cover plate 40 as well as into the arc-shaped groove 35 in the disk 33, if the disk 33 rotates together with the mounting shaft 32 of the mounting member 3 of the illumination device and thus the arc-shaped groove 35 rotationally moves relative to the threaded rod 24, damage to hand fingers can be prevented, because the arc-shaped groove 35 is covered with the cover plate at all times.

Figure 3:
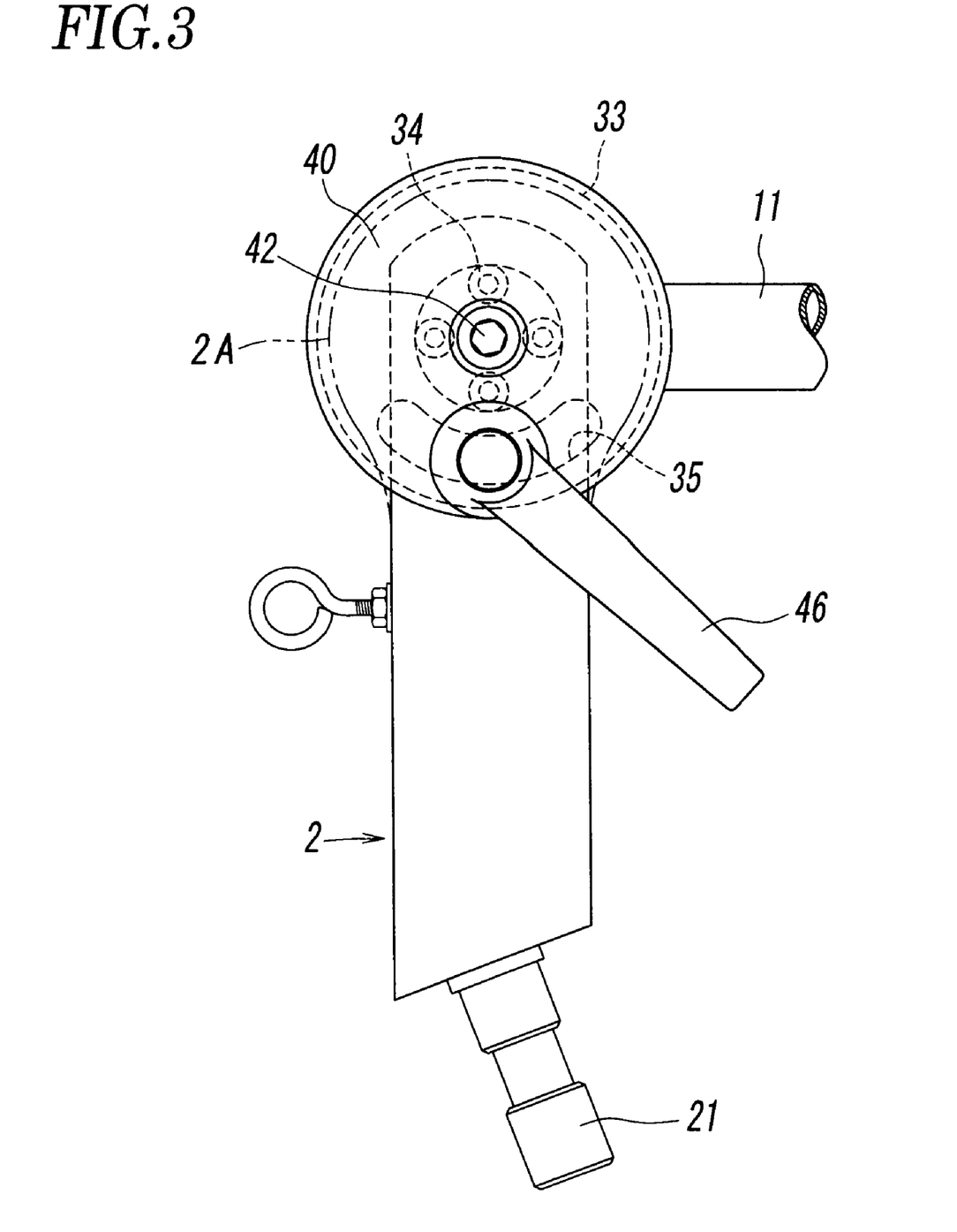
FIG. 3 is a side elevation of the embodiment.

In the illustrated first embodiment, as can be seen from FIG. 3, on the side of the disk 33 facing the support base 2, in the case where the disk 33 rotates to the right or left, the end of the arc-shaped groove 35 is exposed to the outside from the support base 2. It is less likely that hand fingers enter the arc-shaped groove 35 on the side of the support base 2. Furthermore, the presence of the support base 2 hinders fingertips from entering the groove 35. If the danger should be prevented, the support base 2A is shaped to always cover the arc-shaped groove 35 over the disk 33 as the support base 2A indicated by the phantom line.

Figure 9:
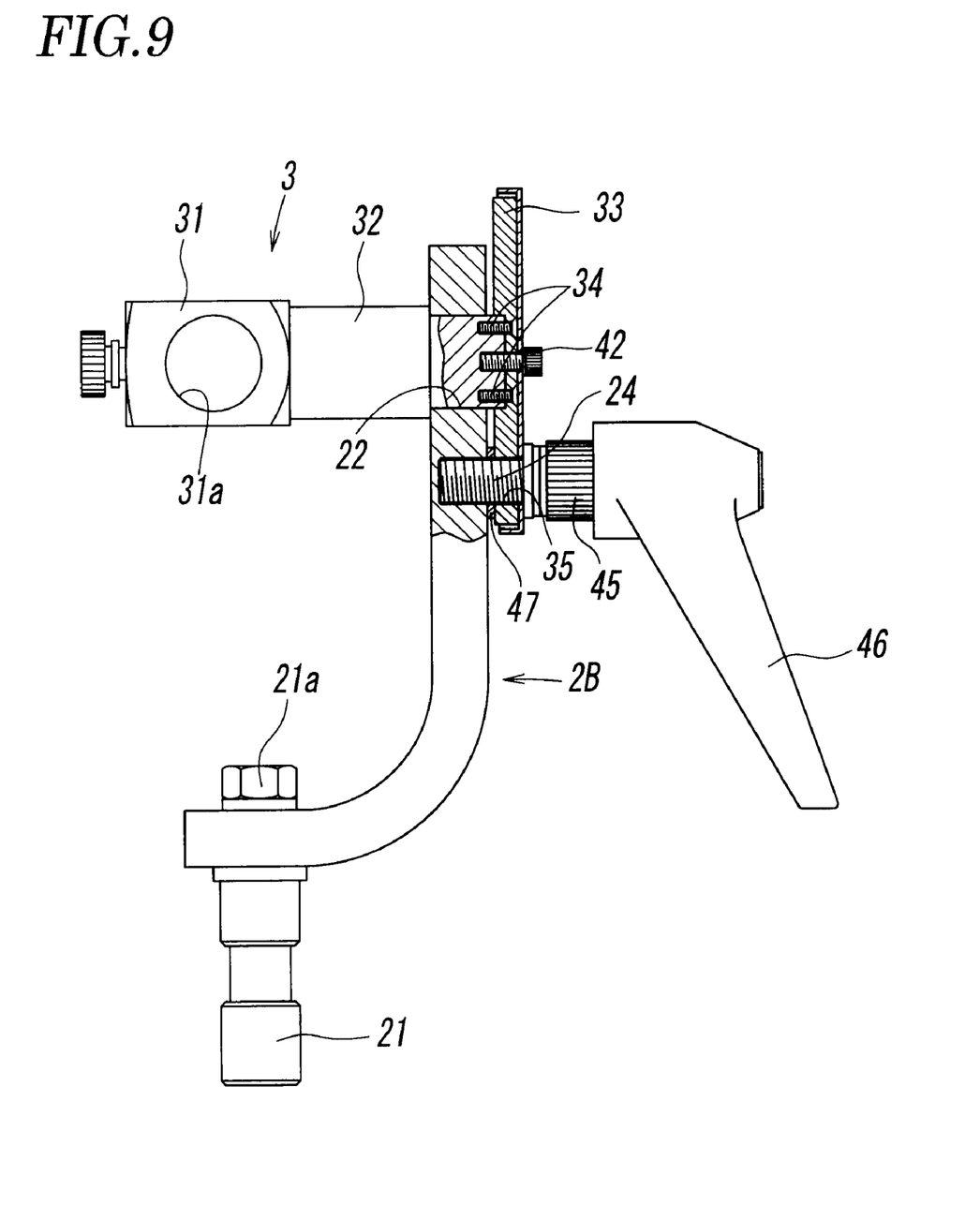
FIG. 9 is a partially cutaway front elevation showing a second embodiment of the tripod head associated with the present invention.
Figure 10:
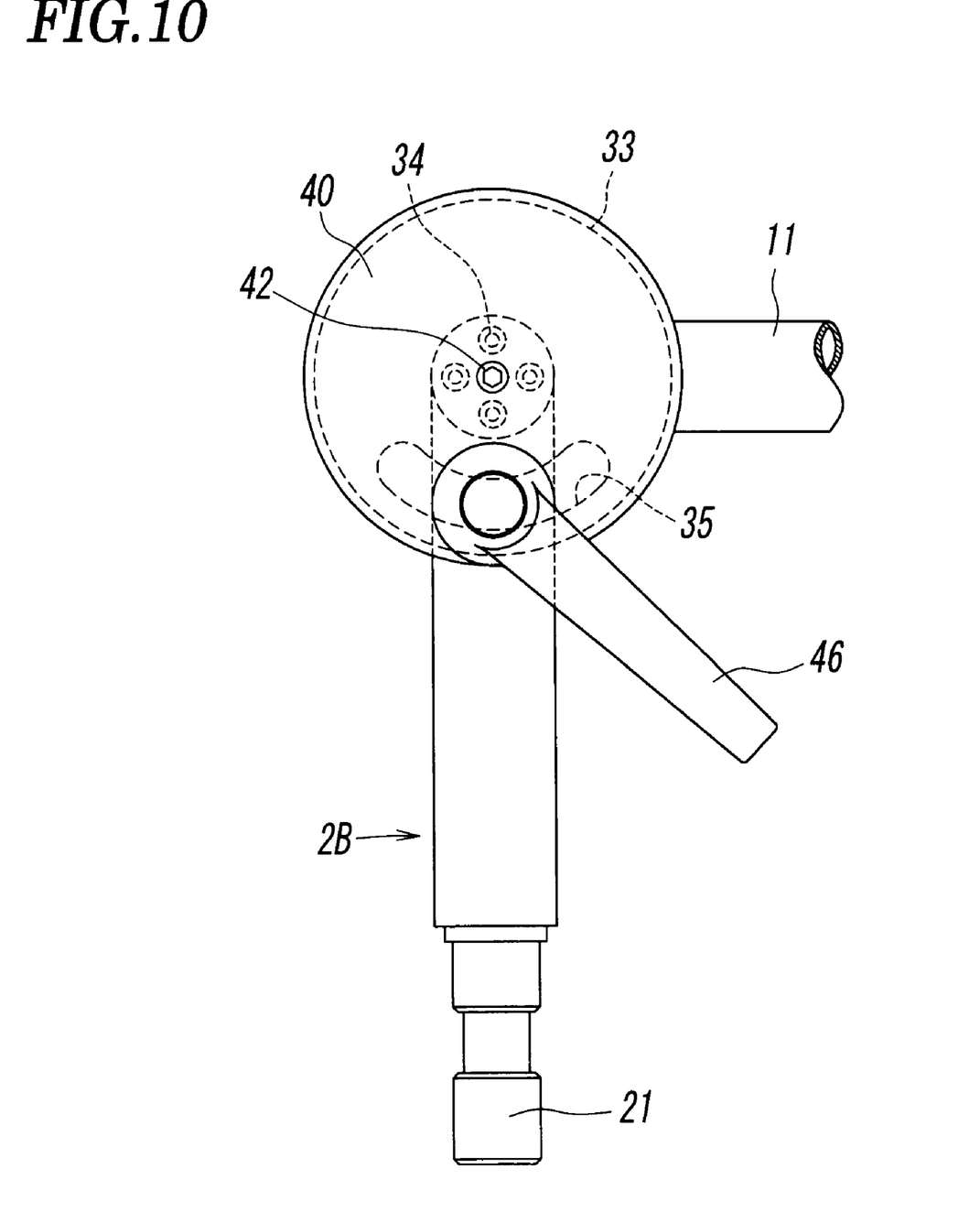
FIG. 10 is a side elevation of the second embodiment.

FIGS. 9 and 10 show a second embodiment of the tripod head associated with the present invention. The tripod head of the second embodiment is similar to the tripod head of the first embodiment mainly except for the form of the support base, indicated by 2B. Those components of the second embodiment which are identical or correspond to their respective counterparts of the first embodiment are indicated by the same reference numerals as in the first embodiment and their description is omitted.

In the second embodiment, the dowel 21 is mounted at the lower end of the support base 2B. The support base 2B is provided with the support hole 22 through which the mounting shaft 32 extends. The lower end of the support base 2B and its portion where the hole 22 is formed are formed by curving a material having a constant cross section. The dowel 21 has a threaded base end inserted in a hole formed in the support base 2B. A nut 21a is threadedly inserted over the threaded base end and held to the support base 2B. Consequently, the support base is made lighter and simpler in structure than in the first embodiment.

The invention claimed is:

1. A tripod head having a mounting member configured to hold a mounting base portion of a device to be held, the mounting member being mountable to a support base such that an angle of depression or elevation of the device is adjustable, said tripod head comprising:
    said support base;
    said mounting member including a mounting shaft mounted to the support base, the mounting shaft extending horizontally through the support base, the mounting shaft being rotatably pivoted, said mounting shaft including a front-end portion extending through the support base;
    a disk coaxial with the mounting shaft, the disk being held to the front-end portion of the mounting shaft;
    an arc-shaped groove formed in a peripheral portion of a face of the disk, the arc-shaped groove being located about an axis of the mounting shaft;
    a threaded rod extending perpendicular from the support base, the threaded rod being inserted in the arc-shaped groove formed in the disk, the threaded rod having a threaded front-end portion; and
    a nut including a handle and threadedly inserted over the threaded front-end portion of the threaded rod,
    wherein fringes of the arc-shaped groove in the disk are configured to be tightened and secured to the support base.

2. A tripod head as set forth in claim 1, wherein when said device to be held is not held to said mounting member, a weight distribution of the mounting member is set so that any eccentric heavy portion that would normally rotate the mounting member about the axis of the mounting shaft is not present.

3. A tripod head as set forth in claim 1, wherein said mounting member has a center of gravity located on the axis of said mounting shaft.

4. A tripod head as set forth in claim 1, further comprising a cover plate coaxial with said disk, the cover plate being rotatable relative to the disk, the cover plate being placed over the disk to cover said arc-shaped groove at all times on a side of the disk facing away from the support base,
    wherein said threaded rod extending perpendicular from the support base is inserted into a circular hole formed in a peripheral portion of the cover plate and inserted into the arc-shaped groove in the disk, and
    wherein said nut permits the disk and the cover plate to be tightened and secured to the support base.

5. A tripod head as set forth in claim 4, wherein said disk is sandwiched between the cover plate located over said mounting shaft and said support base, and wherein the support base covers the arc-shaped groove formed in the disk at all times.

6. A tripod head as set forth in claim 4,
    wherein said device to be held is a photographic illumination device emitting light in a direction of illumination at an angle of depression or elevation,
    wherein said tripod head permits the device to be held to be mounted such that the angle of depression or elevation of said direction of illumination is adjustable,
    wherein said mounting member includes a body portion being integral with the mounting shaft,
    wherein a tubular base member extends along a center axis of the direction of illumination, the tubular base member being mounted on a base portion of the illumination device,
    wherein a securing hole is formed in the body portion of the mounting member, the tubular base member being inserted and held in the hole, and
    wherein said securing hole is provided in a direction perpendicular to the axis of the mounting shaft.

7. A tripod head as set forth in claim 6, wherein the body portion is spaced from the disk.

8. A tripod head as set forth in claim 6, wherein the body portion is disposed on an end of the mounting shaft opposite from the front-end portion.

9. A tripod head as set forth in claim 1, wherein the support base includes a curved cross-section.

10. A tripod head as set forth in claim 1, wherein the threaded rod extends in a direction away from the mounting member.

11. A tripod head, comprising:
    a mounting member configured to hold a mounting base portion of a device to be held;
    a support base, the mounting member being mountable to the support base such that an angle of depression or elevation of the device is adjustable, said mounting member including a mounting shaft mounted to the support base, the mounting shaft extending horizontally through the support base, the mounting shaft being rotatably pivoted, said mounting shaft including a front-end portion extending through the support base;
    a disk coaxial with the mounting shaft, the disk being held to the front-end portion of the mounting shaft;
    an arc-shaped groove formed in a peripheral portion of a face of the disk, the arc-shaped groove being located about an axis of the mounting shaft;
    a threaded rod extending perpendicular from the support base, the threaded rod being inserted in the arc-shaped groove formed in the disk, the threaded rod having a threaded front-end portion; and
    a nut including a handle and being mated to the threaded front-end portion of the threaded rod,
    wherein fringes of the arc-shaped groove in the disk are configured to be tightened and secured to the support base, and
    wherein said mounting member has a center of gravity located on the axis of said mounting shaft.

* * * * *